Figure 5:
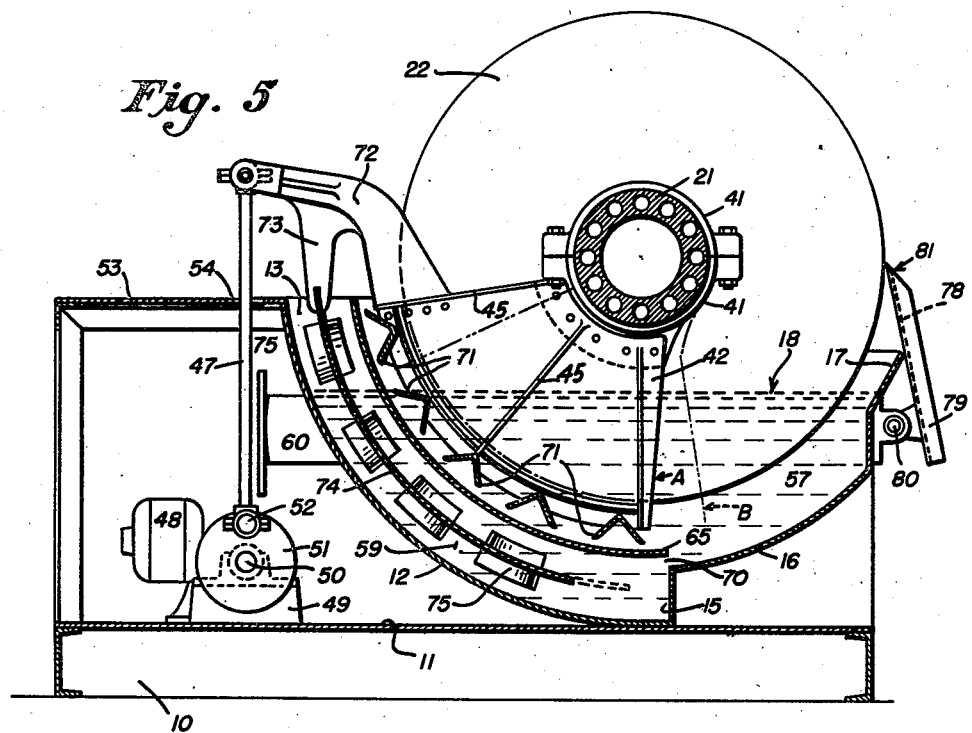

March 2, 1943. C. B. BOWMAN 2,312,620
ROTARY FILTER TANK AND AGITATOR THEREFOR
Filed Jan. 26, 1940 3 Sheets-Sheet 1
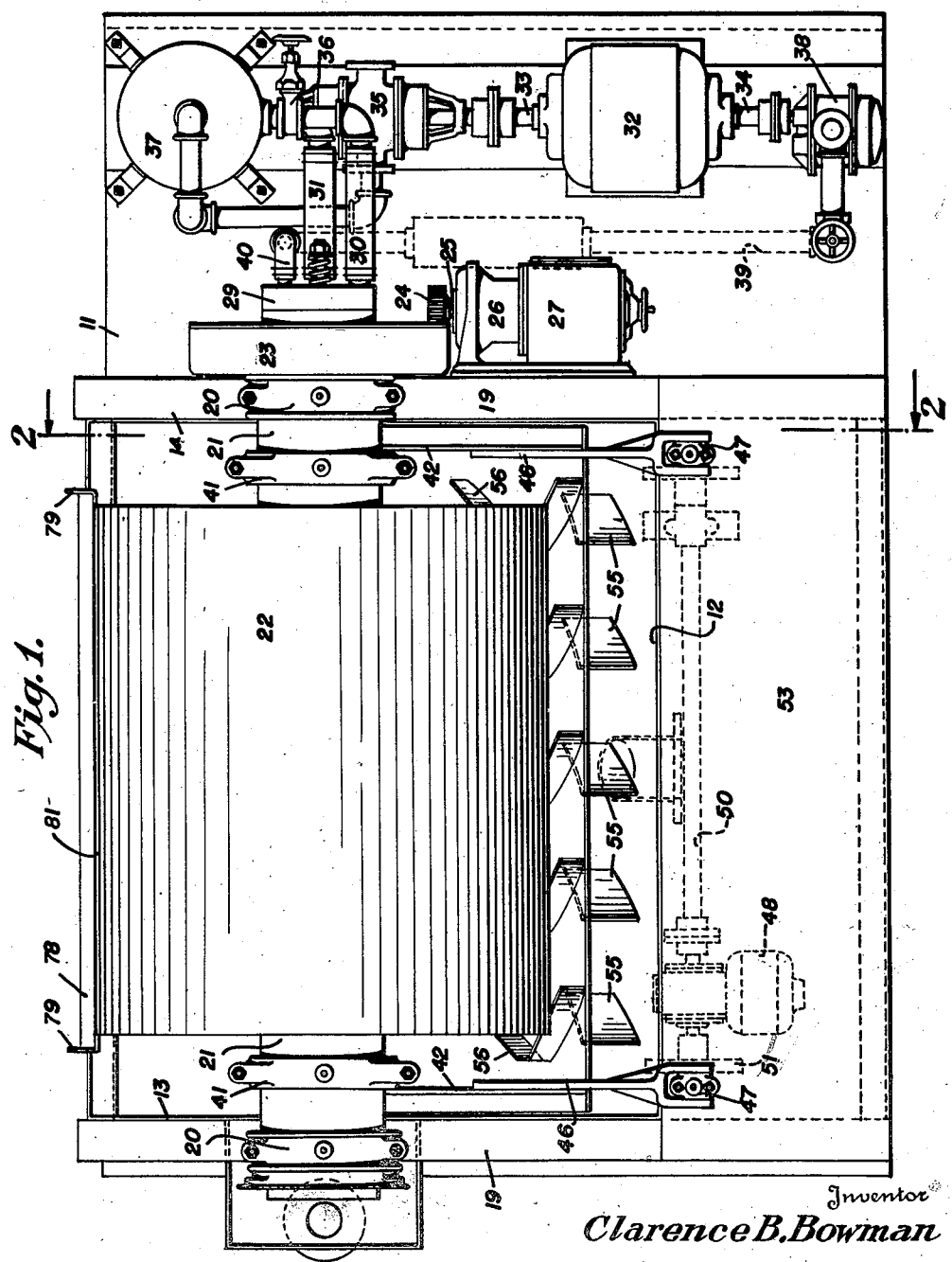
Inventor
Clarence B. Bowman
By Herbert E. Smith
Attorney March 2, 1943.  C. B. BOWMAN  2,312,620
ROTARY FILTER TANK AND AGITATOR THEREFOR
Filed Jan. 26, 1940  3 Sheets-Sheet 2
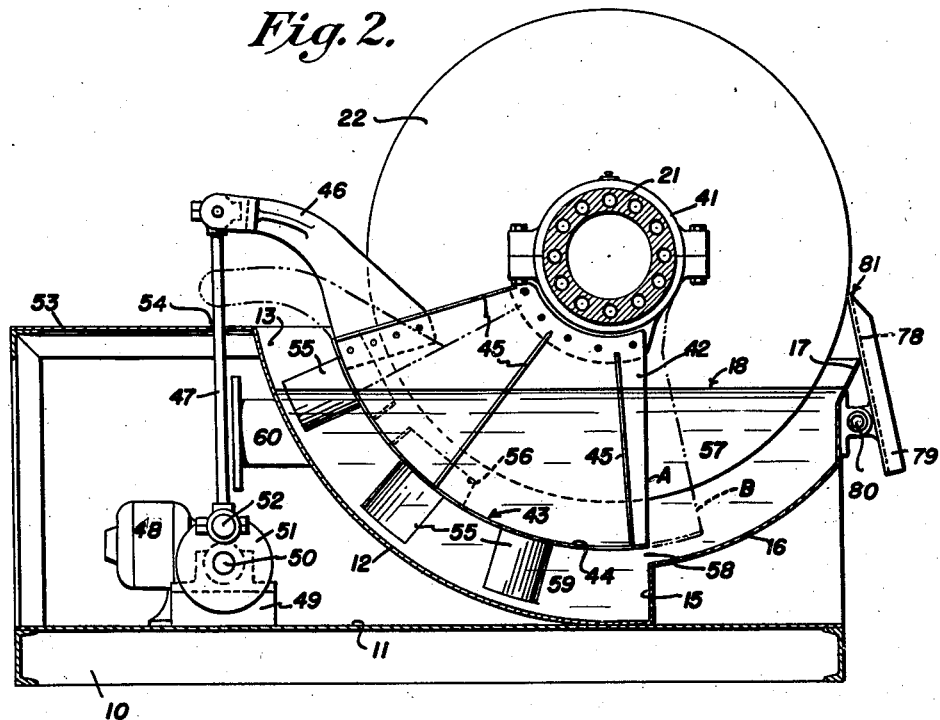
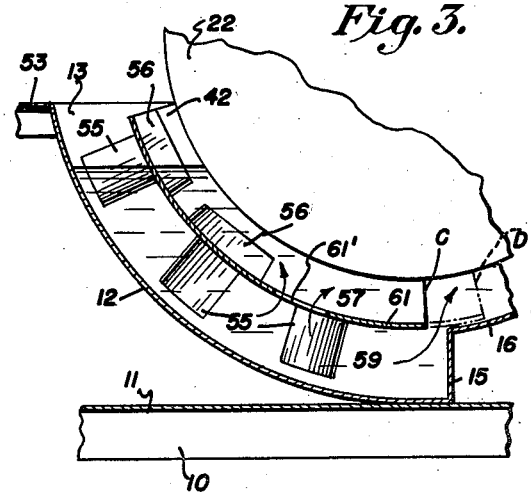
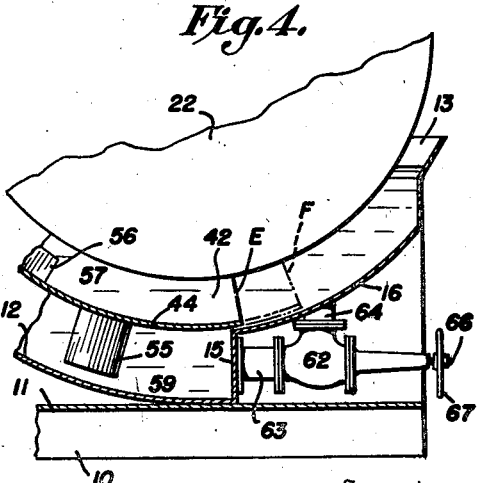
Inventor
Clarence B. Bowman March 2, 1943. C. B. BOWMAN 2,312,620
ROTARY FILTER TANK AND AGITATOR THEREFOR
Filed Jan. 26, 1940 3 Sheets-Sheet 3

Clarence B. Bowman
Inventor

By Herbert E. Smith
Attorney

Patented Mar. 2, 1943

2,312,620

UNITED STATES PATENT OFFICE 2,312,620

ROTARY FILTER TANK AND AGITATOR THEREFOR

Clarence B. Bowman, Salt Lake City, Utah, assignor to The Eimco Corporation, Salt Lake City, Utah Application January 26, 1940, Serial No. 315,736

13 Claims. (Cl. 210—199)

My present invention relates to improvements in rotary filter tanks and agitators therefor for the filtration of solid-bearing solutions and the like.

There are many types of continuous operating filters to which my invention is adaptable, but for the purposes of this description I elect to show the adaptation of my invention to rotary filters of the drum or disc type wherein a drum, a disc, or a multiple arrangement of discs suitably supported upon a rotatable shaft revolves within a tank in the lower portion of which the material to be filtered is supplied. In such filter tanks the filterable material is usually maintained at a level sufficient to receive for immersion, a considerable portion of the lower part of the rotatable filtering units.

It is common practice to rotate the filter drum or discs through this solution and by suction applied to that portion of the device that is immersed to draw the filtrate through an outer surface of cloth, screen, or other covering, thus depositing upon that outer surface a residue. At the same time the filtrate is conducted into a central ported shaft and thence out of the machine to be disposed of as desired. As the filter device rotates further continued suction applied to the under side of the outer surface further de-hydrates or "cakes" the residue, which is subsequently offered to means for removing it from the filter surface. It may be subjected to the washing action of water sprays or other means, or it may be removed by means of scrapers suitably supported adjacent the outer or filter surface and this residue when removed is usually conveyed away for further treatment or storage or the like. When the residual "cake" has been removed and the filter unit has a clean outer surface it is ready to be again presented to the filterable material contained in the tank.

It is common practice to introduce into the filterable material reagents of a chemical nature which hasten the solidification of the solids to be filtered or to decrease the amount of solid material which might ordinarily pass through the filtering surface or for other reasons not pertinent to this discussion.

In order to secure the maximum efficiency of the reagents, the agitation of the filterable solution and the reagents is absolutely necessary. Many attempts have been made to accomplish this agitation by separate mixing or agitating devices associated with the feed line to the filter tank through which the agitated material is fed to the filter for treatment as above described.

It is of prime importance in filtering that the agitation be accomplished as close to the filtering operation as is possible in order to insure that when the filterable material is presented to the filter surface it will be highly agitated and the full benefits of the reagents will be realized. In other instances mechanical mixing devices have been installed in the filter tank containing the filterable solution. They consist of rakes, paddles, or other devices. Because of the great quantity of solution handled and because of space limitations usually encountered, no great success has been before this realized through mechanical agitation in the filter tank.

It is an important object of this invention to combine with the filter tank an integral mixing tank and mixing mechanism of a suitable design to accomplish the desired solution agitation in the immediate proximity of the filtering operation just prior to the moment the solution is offered to the filter unit.

It is a further important object of this invention to provide mechanical agitation means which are compact, simple in operation, and economical to construct.

It is another object of my invention to incorporate an agitating mixer mechanism within the filter tank closely adjacent to the filter device wherein there are common means for driving both the mixing tank agitator and the filter tank agitator.

A still further object of my invention has been the provision of agitation means for a mixing tank and for the filter tank which may be slightly modified with ease and without material change to meet varying conditions encountered in the actual operation of filtering.

Still another object of my invention has been the provision of a filter tank having a system therein forming adjacent mixing and filtering zones for the filterable solutions and including means for agitating said solutions.

Other objects and advantages of the invention will be apparent during the course of the following description.

Figure 6:
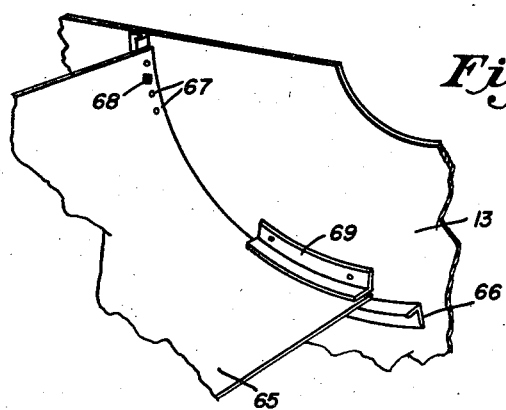

In the accompanying drawings forming a part of this specification and in which like numerals designate like parts throughout the same, Figure 1 is a plan view of a drum type filter equipped with my invention and showing the conventional operating devices employed therewith, Figure 2 is a vertical transverse sectional view taken along lines 2—2 of Figure 1 with the scope of movement of the agitator means indicated in dotted lines, Figure 3 is a fragmentary vertical sectional view illustrating the form of a modification which my invention might take with the movement of the agitator means indicated in dotted lines, Figure 4 is also a fragmentary transverse sectional view showing a further modification of my invention with the alternate position of the moving parts indicated in dotted lines, Figure 5 is a vertical transverse sectional view taken through a plane similar to that of Figure 2, but of a device which is a modification of the showing of Figures 1 and 2 and in this view in dotted lines I have indicated the scope of movement of the agitator means, and Figure 6 is a fragmentary perspective view of a portion of one end of my filter tank and a portion of the divider plate or system used in the modified device of Figure 5.

In the drawings for the purpose of illustration I have shown a preferred embodiment of my invention as adapted to use on a drum filter, but it is to be understood and it is here definitely pointed out that I do not wish to be limited by the showing of the exemplifying structure, as it will be obvious from the following description that my invention is adaptable to a single disc filter, or a multiple arrangement of discs and for other devices in which agitation of a solution is deemed necessary or considered advisable.

Referring now to Figure 2, the numeral 10 designates a base structure formed of structural shapes, in this instance channel beams, upon which is supported the base plate or flooring 11. The filter tank comprises a major arcuate wall 12 supported upon the base plate 11 and having end walls 13 and 14. A vertical longitudinal riser or abutment wall 15 rises upwardly from the base 11 and the lower terminus of the wall 12 and it joins at its upper end the minor arcuate wall 16 which may curve upwardly and is shown in this exemplification to be concentric with the central axis of the filter device to be later described.

The upper portion of the wall 16 is raised in such a manner as to bring the edge 17 of the tank high enough to afford a suitable pulp level, indicated by the numeral 18. Upon each end of the base formed by the elements 10 and 11 I erect frame super-structures 19—19 and bearings 20—20 are provided for the journaling of the filter shaft 21. The filter drum 22 is suitably supported upon the filter shaft 21 in the usual manner.

As may best be seen in Figure 1, the right-hand end of the shaft 21 has a gear, not shown, the drive housing 23 and a gear 24 upon a shaft 25 protruding from the speed reducer 26, rotated by means of a drive motor 27, and meshes with gear on shaft 21 to rotate the shaft.

The shaft 21 has inner longitudinal ports 28 and an automatic valve, indicated by the numeral 29, communicates with the outer ends of the ports 28 and suction and feed lines 30 and 31 are connected to this valve. A circulatory motor 32 having shaft extensions 33 and 34 is mounted upon the base plate 11. The shaft 33 drives a vacuum pump 35 and the negative air pressure produced by means of this pump operates upon the connections 30 and 31 and may be controlled by the valve 36. A filtrate receiver 37 is connected to the vacuum pump 35 and solution drawn out of the filter tank through the filter drum 22 passes therethrough and may be conveyed out of the system by means of a filtrate pump (not shown) which may be operated also on a further extension of the shaft 33.

Upon the shaft 34 I have shown a blower 38 and, by means of the conduit 39, air under pressure is conveyed to the coupling 40 and through the valve 29 to certain of the ports in the shaft 21 to provide a blast of compressed air upon that segment or those segments of the drum 22 which may be in communication therewith to loosen the "cake" deposited on the surface.

About the shaft 21 I secure loosely split collars 41—41 which are mounted for oscillation upon the shaft 21, but independent of its rotary movement. Depending from these collars are a pair of side plates 42—42 having curved outer edges 43 to which are secured the longitudinally disposed, curved oscillator plate or septum 44. The inner face of the plates 42 may have agitator ribs 45—45 extending outwardly at right angles to the plates. An agitator arm 46 is shown attached to each of the plates 42 and extending upwardly and outwardly over the upper lip of the tank. Depending connecting rods 47 are attached for oscillatory movement to the arms 46.

A motorized speed reducer 48 mounted on the base 49 drives the crank shaft 50 and the crank discs 51—51 rotate therewith upon the operation of the motor 48. Suitable crank pins 52 stand outwardly from the face of the crank discs 51 and the lower end of the connecting rods 47 are fastened thereto.

A shelf 53 is sometimes supported above the base plate 11 and is substantially an outward extension of the tank. Reagent-feeder devices may be mounted upon such a shelf, and openings 54 in the shelf are then necessitated to permit the movement of the connecting rod 47 therethrough.

Upon the lower face of the oscillator plate or septum 44 I form curved or pitched agitator blades 55, which extend outwardly from the plate 44 and to close proximity with the tank wall 12. Similarly ribs or agitator fins 56 are secured on the inner face of the septum 44 in this space between that plate and the outer periphery of the drum 22. While the oscillator plate 44 is concentric with the central axis of the shaft 21, it is fitted in relatively close concentricity to the walls 17 and 16 of the tank and serves to divide the entire inner chamber of the tank into two zones.

A filtering zone 57, bounded at the ends by the walls 13 and 14 and at its bottom by the wall 16 and the inner face of the septum 44 is thus formed. There may be however, a slight gap 58 between the edge of the septum 44 and the terminus of the wall 16 at its juncture with the abutment 15.

The agitator or mixing zone 59 is formed by the end walls 13 and 14 of the tank, by the wall 12 on the bottom of the tank, by the outer face of the septum 44 on the top, and by abutment 15 which rises from the base 11. The zones 57 and 59 are in communication with each other and fluid in the zone 49 can pass through the passageway or throat 58 between the oscillator plate and the wall 16. Solution-bearing solids which are to be filtered are introduced into the filter tank through a flanged feed tube 60 which may be connected to a feed line. The feed tube delivers material into the mixing zone 59 where it is agitated before being passed into the filter zone 57.

In Figure 3 I show a modified form of my invention and in this instance I closely fit the modified oscillator plate or septum 61, having the above described agitator plates 55 and 56 on opposite sides, to the curved wall 16 and I also show at 61' ports through which mixed and agitated filterable solution may pass.

Referring now to Figure 4 wherein is disclosed another slight modification of my invention in which case the oscillatable septum 44 is shown as arranged to closely fit the wall 16 and to oscillate in close proximity therewith in such a manner that no gap is ever provided between the edge of the plate 44 and the wall 16. In this instance to permit the flow of the filterable solution from the chamber 59 to the chamber 57 I have shown the angle or elbow valve 62 to which is connected the inlet pipe 63 and the discharge pipe 64. By means of a handle 67 on the stem 66 of the valve, the control of the fluid passing through the valve may be closely regulated.

Figure 5 illustrates a further modified form of my invention. In this modification I form my tank in the customary manner having end walls 13 and 14, a major arcuate wall 12 supported on the base plate 11. A vertical longitudinal riser wall is provided adjacent the lower terminus of the wall 12 and extends between the end walls 13 and 14 and connects with the lower terminus of the minor arcuate wall 16.

Supported in substantially concentric spaced relation to the plate 12 is the septum 65, which in Figure 6 is shown resting upon a structural member 66 secured to the end wall 13 and having a series of holes 67 near the upper end edges, and securing means 68 such as a bolt and nut passing through the structural member 66 and the holes 67 to secure the septum in place. The matching anchor member 69 may be used to hold the lower edge of the plate down and against displacement.

When the plate 65 is supported within the tank, the filtering zone 57 and the mixing zone 59 are formed according to the above description. As shown in Figure 5, the lower terminal of the plate 65 and the upper edge of the riser 15 at its juncture with the minor arcuate member 16 are spaced apart to form the discharge gap 70.

From the collars 41—41 depend the side plates 42 and the lower edges of the side plates are adapted to receive the agitator elements 71, which in this modified form of my invention are shown to be structural angles that extend longitudinally of the tank in varying proximity to the upper face of the plate 65. The agitator arm 72 attached to the plates 42 extend outwardly away from the disc 22 and the connecting rods 47 are attached in the manner described further in this specification.

An oscillatory depending arm 73 on the agitator arm 72 supports in a cantilever manner the agitator plate 74, upon one or both sides of which may be secured pitched agitator blades 75 or other types of agitator means, which when the plate 74 is oscillated in the chamber 59 will impart a turbulence to the solution therein, and cause a thorough suspensive intermixing of the material to be filtered and its liquid vehicle. As the agitator arm is oscillated through the action of the connecter 47, the elements 71 and 75 are caused to pass in an oscillatory manner through the fluids in the zones 57 and 59. On the downward stroke of these agitator devices the fluids in these two chambers are violently churned and the fluid from the chamber 59 is caused to pass to the chamber 57 through the throat or aperture 70.

I have indicated in Figure 5 by the letter A the retarded position assumed by the forward edge of the arm 42, and by the letter B the forward or advance position of the arm.

A surface scraper for the filter drum comprises a blade 68 having end flanges 69 and is supported on the pivot 70 from the side of the tank and the scraper edge 71 is maintained at all times in contact with the surface of the filtering drum 22 to remove the "cake" therefrom as it rotates.

*Mode of operation*

In filtering operations the pulp or filterable solution is fed into a filter tank substantially as shown in Figure 2 and the drum or disc rotates with the lower portion thereof being immersed in the solution, during which stage of operation the solids in the liquid as well as the liquid are attracted to the filter drum by suction and the filtrate passes through the drum surface and into the ported shaft 21.

According to the principles of my invention I provide a filter tank having a mixing zone and a filtering zone with a plate or septum which may carry agitator members in these zones. The filterable solution passing into the tank enters through the tube 60 into the agitation zone 59 and as the septum plates 44 or 74 are oscillated in their arcuate paths, the agitator elements or fins 55 or 75 stir the solid-bearing solution and cause it to travel to the zone 57 through the throat 58 or 70 where it is brought in immediate contact with the filtering surface of the drum.

Simultaneous with the agitation in the zone 59, the liquid in the zone 57 is being agitated by the blades 45 and 56. For the purposes of this description I have indicated by the use of the reference letter A the retarded position assumed by the forward edge of the oscillator septum 44 and the depending arms 42, and by the reference letter B the forward or advanced position of the blade and its arms.

It is to be understood that due to the agitation of the solution in the zone 59 caused by the forward passage of the blades 55, a pressure is applied upon the liquid forcing it against the abutment 15 thence through the throat or passage 58, whereupon it surges with considerable force and turbulence into the zone 57. This agitation accomplishes the desired purpose of maintaining the solids in solution, thoroughly intermixing the reagents and presenting the agitated solution immediately to the filter surface before any possible lapse of time can occur, during which the solids might have been acted upon by gravity and caused to precipitate.

In the modified form of my invention shown in Figure 3 I mount the septum 60 close to the plane of the element 16 so that when the septum and its depending arms swing from the retarded position indicated by the reference numeral C to the forward position D, the passageway or throat between the plate 60, which I have previously indicated by the numeral 58, is closed and the plate 61 acts in the manner of a valve. In this instance the pressures applied to the solution by the forward travel of the blades 55, dammed or backed up during a portion of the oscillatory movement of the agitator element against the wall 15 and is permitted to escape outwardly through the port or opening 61' into the zone 57. In certain pulps or filterable solutions this modification is highly useful as it imparts a further turbulence to the solution, thus maintaining a greater percentage of solids therein.

Referring now to Figure 4, the plate 44 is fitted close enough to plate 50 in both the retarded position indicated by the numeral E and in the forward position indicated by the numeral F so that there is no direct communication between the mixing zone 59 and the filtering zone 57. The purpose of this valving of the tank is so that the fluids in the zone 57, when pressure is applied to them by a forward movement of the blades 55, will be forced to pass through the valve 62 before entering the zone 57 and by opening or closing the valve 62 in the usual manner a regulated flow of thoroughly agitated solution is obtained.

The modified form of my invention shown in Figures 5 and 6 presents a device slightly at variance with that in Figure 2 in mechanical construction, but in all respects having a similar principle of operation. The chief difference between this modification and the showing of Figure 2 is that the septum plate 65 is fixed in distinction to the oscillatable plates 44 or 61. The filtering and the mixing zones are the same and in each zone are oscillatable agitator means that operate to thoroughly mix and intermingle the constituents in the two zones, and the fluid in the zone 59 passes to the zone 57 through the throat 70.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus fully described my invention, what I claim as new and desire to secure by Letters Patent is:

1. In a filter having a horizontally rotatable vacuum filter member and means to operate the same, a tank enclosing the lower portion of said filter member and comprising a wall spaced from the periphery of said filter member, a riser extending upwardly from the lower edge of said wall, a second wall extending generally upward from the upper edge of said riser, and end walls joining said walls and said riser to define an enclosing tank, a rockable arm journalled concentric with the axis of rotation of said filter member and depending into the filter compartment, means for rocking said arm upon its journal, a septum exterior of the filter member and on said rockable arm dividing said tank into an adit and a filter compartment and cooperating with the riser to open and close communication between said compartments upon rocking movement of said arm, said adit chamber having an inlet, and means in the adit compartment for agitating solution therein.

2. In a filter having a horizontally rotatable vacuum filter member and means to operate the same, a tank enclosing the lower portion of the said filter member and comprising a wall spaced from the periphery of said filter member, a riser extending upwardly from the lower edge of said wall, a second wall extending generally upward from the upper edge of said riser, and end walls joining said walls and said riser to define an enclosing tank, a rockable arm journalled concentric with the axis of rotation of said filter member and depending into the filter compartment, means for rocking said arm upon its journal, a septum exterior of the filter member and on said rockable arm dividing said tank into an adit and a filter compartment and cooperating with the riser to open and close communication between said compartments upon rocking movement of said arm, said adit chamber having an inlet, and agitator means on said septum and projecting into the adit compartment operable upon rocking movement of the rockable arm to agitate solution therein.

3. In a filter having a horizontally rotatable vacuum filter member and means to operate the same, a tank enclosing lower portion of the said filter member and comprising a wall spaced from the periphery of said filter member, a riser extending upwardly from the lower edge of said wall, a second wall extending generally upward from the upper edge of said riser, and end walls joining said walls and said riser to define an enclosing tank, a rockable arm journalled concentric with the axis of rotation of said filter member and depending into the filter compartment, means for rocking said arm upon its journal, a septum exterior of the filter member and on said rockable arm dividing said tank into an adit and a filter compartment and cooperating with the riser to open and close communication between said compartments upon rocking movement of said arm, agitator ribs on the rockable arm operable to agitate solution in the filter compartment, said adit chamber having an inlet, and agitator means on said arm operable to stir solution in the adit compartment.

4. In the art of filtering solutions, the combination comprising: a tank including side and end walls, a rotary filter in the tank, a septum between the filter and the side wall and extending between the end walls of the tank to form an adit chamber extending from end to end of the tank, a riser projecting abruptly from the side wall of the tank and extending between the end walls of the tank to form an end wall of the adit chamber, said adit chamber having disposed at opposite ends thereof an inlet and an outlet, said riser having an abutment face within the adit chamber adjacent to the outlet therefrom, oscillatable agitator means in the adit chamber and having motion between the inlet and the outlet and toward the abutment face of the riser to move and agitate fluid contained in said chamber, said outlet from the adit chamber being the inlet to the filter chamber and communicating directly with the filter, and means for oscillating said agitator means.

5. In the art of filtering solutions, the combiantion comprising a tank having an inlet for filterable solution, a rotary filter in said tank, an oscillatable imperforate septum between the inlet and the filter, means for oscillating said septum, and agitator means carried by said septum on the inlet side and operable upon incoming filterable solution.

6. In the art of filtering solutions, the combination comprising: a tank including side and end walls, a rotary filter in the tank, an oscillatable septum between the filter and the side walls of the tank and extending between the end walls of the tank to form an adit chamber extending from end to end of the tank, means for oscillating said septum, a riser projecting abruptly from the side wall of the tank and extending between the end walls of the tank to form an end wall of the adit chamber, said adit chamber having disposed at opposite ends thereof an outlet and an inlet, said riser having an abutment face within the adit chamber adjacent to the outlet therefrom, and agitator means carried by the septum within the adit chamber and operable to move and agitate filterable solutions introduced thereto, said outlet from the adit chamber being the inlet to the filter chamber and communicating directly with the filter.

7. In the art of filtering solutions, the combination of a tank having an inlet and comprising end walls and a curved bottom therebetween; said bottom having a first arcuate wall, a second arcuate wall having greater curvature and offset from said first arcuate wall, and a riser wall connecting the offset edges of said arcuate walls; a curved septum within said tank and parallel to said second arcuate wall and having an edge adjacent the juncture of the riser with the first arcuate wall whereby the tank is divided into an adit chamber and a filter chamber; a rotary filter in said filter chamber; agitator means operable upon solutions in the adit chamber between the second arcuate wall and the septum and toward the riser; means for operating the agitator; the edge of the septum adjacent the juncture of the riser with the first arcuate wall being spaced therefrom to form an outlet from the adit chamber to the filter chamber.

8. In the art of filtering solutions, the combination of a tank having an inlet and comprising end walls and a curved bottom therebetween; said bottom having a first arcuate wall, a second arcuate wall having greater curvature and offset from first arcuate wall, and a riser connecting the offset edges of said arcuate walls from end to end; a rotary filter in said tank; an oscillatable septum between the inlet and the filter and curved similarly to said tank walls, said septum with said second arcuate wall and said riser defining an adit chamber; means for oscillating said septum; said adit chamber having a passage forming an outlet therefrom and comprising an inlet to the filter chamber; said passage being located adjacent the riser; and agitator means carried by the septum or the adit chamber side and operable upon solution within said adit chamber and toward the riser.

9. In the art of filtering solutions, the combination comprising a tank having an inlet for filterable solution, a rotary filter in said tank and having an axial supporting shaft, an oscillatable septum in said tank between the inlet and the filter and rockably suspended from the filter shaft, means for oscillating said septum, and agitator means carried by said septum on its inlet side and operable upon filterable solution on the inlet side thereof.

10. A structure according to claim 9 wherein the agitator means comprises pitched agitator blades on the inlet and filter sides of said septum and operable upon filterable solution disposed on each side of the septum.

11. A structure according to claim 9 wherein the oscillatable septum is perforated and curved to the contour of the rotary filter and adapted thereby to sweep in its oscillations close thereto.

12. In the art of filtering solutions, the combination of a tank having an inlet and comprising end walls and a curved bottom therebetween; said bottom having a first arcuate wall, a second arcuate wall having greater curvature and offset from the first arcuate wall, and a riser wall connecting the offset edges of said arcuate walls from end to end; a curved oscillatable septum in the tank and lying alongside and spaced from the second arcuate wall and cooperating with said second arcuate wall, the end walls of the tank and the riser to define a curved adit chamber; the remainder of said tank comprising a filter chamber; a rotary filter in said filter chamber; said adit chamber having a passage therefrom adjacent the riser and forming an outlet from the adit chamber and an inlet to the filter chamber; and agitator means carried by the septum and located within the adit chamber and operable upon solution therein and toward the riser.

13. In the art of filtering solutions, the combination comprising: a tank including side and end walls; a rotary filter in the tank; a septum between the filter and the side wall and extending between the end walls of the tank to form an adit chamber extending from end to end of the tank; a riser projecting abruptly from the side wall of the tank toward the septum and extending between the end walls of the tank to form an end wall of the adit chamber; said adit chamber having disposed at opposite ends thereof an inlet and an outlet; said riser having an abutment face within the adit chamber and adjacent the outlet therefrom; oscillatable agitator means in the adit chamber and having motion between the inlet and the outlet and toward the abutment face of the riser to move and agitate fluid contained in said chamber; said outlet from the adit chamber being the inlet to the filter chamber and communicating directly with the filter, means for oscillating said agitator means, and means timed with the oscillations of the agitator means varying the capacity of the outlet from the adit chamber.

CLARENCE B. BOWMAN.